United States Patent
Black et al.

(10) Patent No.: US 8,069,178 B1
(45) Date of Patent: Nov. 29, 2011

(54) SYSTEM FOR CREATING AND USING HETEROGENEOUS ARRAYS

(75) Inventors: Jennifer Black, Ashland, MA (US); David A. Foti, Tolland, CT (US); Joseph F. Hicklin, Upton, MA (US)

(73) Assignee: The MathWorks, Inc., Natick, MA (US)

( * ) Notice: Subject to any disclaimer, the term of this patent is extended or adjusted under 35 U.S.C. 154(b) by 452 days.

(21) Appl. No.: 12/403,852

(22) Filed: Mar. 13, 2009

(51) Int. Cl.
  *G06F 17/30* (2006.01)
  *G06F 7/00* (2006.01)
(52) U.S. Cl. .................. 707/755; 707/804; 707/805
(58) Field of Classification Search .................. 707/755, 707/804, 805
  See application file for complete search history.

(56) References Cited

U.S. PATENT DOCUMENTS

2010/0275070 A1 * 10/2010 Mercer et al. .................. 714/49

* cited by examiner

*Primary Examiner* — Kuen Lu
(74) *Attorney, Agent, or Firm* — Nelson Mullins Riley & Scarborough LLP

(57) ABSTRACT

In an embodiment, a computer-implemented technique for accessing heterogeneous objects in an array is discussed. The method determines a greatest common base class hierarchically common to elements populating a heterogeneous array. A common subset of methods that is available for use with the elements is identified. The common subset of methods belongs to the greatest common base class. A method supported by the common subset of methods is called with the array as a parameter. The method operates on the array as an array consisting of greatest common base class objects.

20 Claims, 9 Drawing Sheets

SYSTEM FOR CREATING AND USING HETEROGENEOUS ARRAYS

BACKGROUND INFORMATION

Many programming languages such as graphical programming languages, textual programming languages and dynamically typed array-based languages, provide support for classes and object-oriented programming. Array-based languages are a mechanism used to solve many different mathematical and scientific computing problems. Object-oriented programming languages support the concept of inheritance which allows new classes to be derived from existing classes.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

Overview

Figure 1:
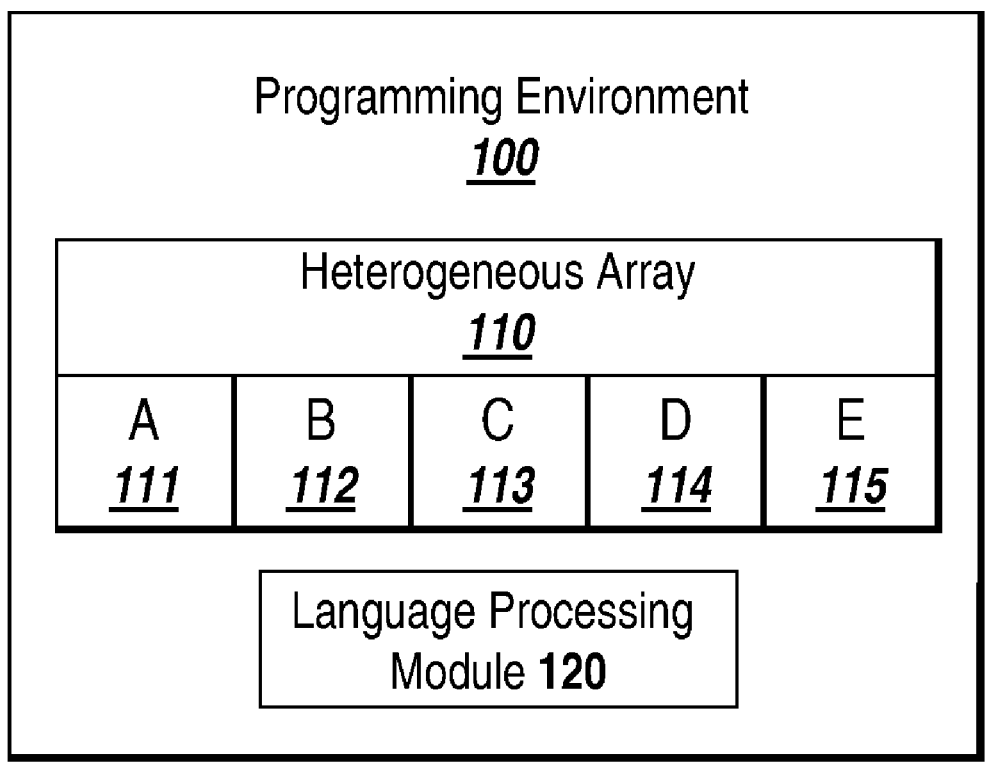
FIG. 1 depicts an exemplary programming environment including a heterogeneous array.

Exemplary embodiments create and utilize heterogeneous arrays of objects that differ in their specific class but are related to one another through inheritance. All of the specific class instances in the heterogeneous array may derive directly or indirectly from a base class. A greatest common base class for the elements populating the heterogeneous array is identified that is hierarchically common to those elements in the array. The greatest common base class is thus the most specific class to which all of the instances in a heterogeneous array population belong. By definition, there is no further subclass of the greatest common base class to which all of the instances in the heterogeneous array also belong. The identification of the greatest common base class may increase the functionality of the array by enabling users to access the largest possible common subset of methods. The heterogeneous array may be used as a parameter when calling one of the methods supported by the identified greatest common base class. Changes to the heterogeneous array through the adding, overwriting or subtracting of unique class instances results in a re-calculation of the greatest common base class for the array and the identification of different supported methods for the new greatest common base class that are valid to act on the heterogeneous array.

The base class may define support for heterogeneous arrays by some declaration understood by the programming environment to mean support for heterogeneous arrays. In some programming environments, this base class may be called an interface, a type, or by some other name. The declaration may, for example, specify a special super-class, abstract super-class, interface, type, type modifier, or class attribute. The base class may be considered its own subclass and a heterogeneous array may contain instances of a base class and instances of other subclasses of that base class. In the heterogeneous array the class of each element is the most specific class to which that element belongs.

In an embodiment a computer-implemented method of accessing heterogeneous objects in an array includes providing a base class in a programming environment provided by a computing device. The base class supports heterogeneous array behavior. A heterogeneous array is created in the programming environment. The elements in the heterogeneous array are of either the base class or a subclass of the base class. The method also determines, with the computing device, a greatest common base class hierarchically common to the elements. The method also identifies programmatically using the computing device a common subset of methods available for use with the elements. The common subset of methods belongs to the greatest common base class. The array is used as a parameter in a call of a specified method that is included in the common subset of methods. The specified method operates on the array in the programming environment as an array consisting of greatest common base class objects. A result of the specified method call is displayed or stored.

In another embodiment, a computer-implemented method of accessing heterogeneous objects in an array includes providing an abstract heterogeneous array class for an array-based language in a programming environment provided by a computing device. The method derives a base class from the abstract heterogeneous array class and derives, directly or indirectly, subclasses from the base class. Objects are instantiated from the subclasses to create subclass instances which are used to populate a heterogeneous array. A greatest common base class for the subclasses is programmatically identified that is hierarchically common to the subclasses. The method also uses the array as a parameter in a method call supported by the greatest common base class. The called method operates on the array as an array consisting of greatest common base class objects. The result of the method call is displayed or stored.

In an embodiment, a computer-implemented method of accessing heterogeneous objects in an array associated with a graphical figure window includes providing a graphical figure window in a programming environment provided by a computing device. The graphical figure window includes different types of interacting objects that have been instantiated from multiple subclasses derived directly or indirectly from a base class defining heterogeneous array behavior. An array in the programming environment is populated with references to the different types of interacting objects. The method programmatically identifies a common subset of methods available for use with the interacting objects referred to by the references. The common subset of methods belongs to a greatest common base class that is hierarchically common to the subclasses. The array is used as a parameter in a call of a specified method that is included in the common subset of methods. The specified method operates on the array in the programming environment as an array consisting of greatest common base class objects. The result of the specified method call is stored or displayed.

Exemplary System

FIG. 1 depicts an exemplary programming environment 100 including a heterogeneous array. Programming environment 100 provides support for classes and object-oriented programming and may include a language processing module 120. Programming environment 100 may be a textual programming environment or a graphical programming environment and may provide support for a dynamically typed array-based language. Programming environment 100 may be used to create heterogeneous array 110. Heterogeneous array 110 includes elements 111, 112, 113, 114 and 115 that are unique subclass instances (or references to the unique subclass instances) that are instantiated from two or more subclasses derived directly or indirectly from a common base class. Heterogeneous array 110 may also include instances derived from the common base class. A heterogeneous array thus differs from a homogeneous array in which the elements are class instances that belong to a single class or subclass.

Exemplary Class Hierarchy

Figure 2:
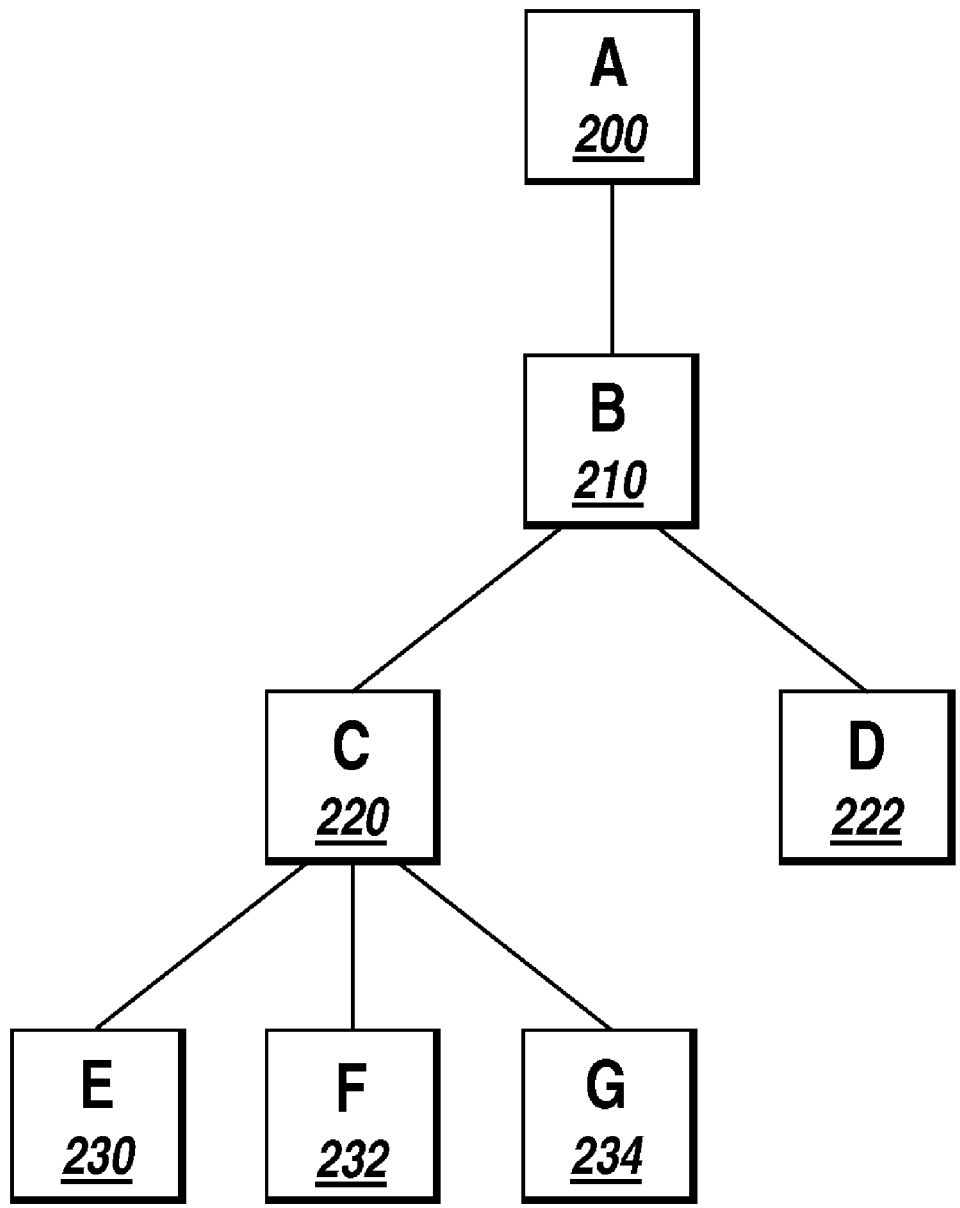
FIG. 2 depicts an exemplary class hierarchy.

FIG. 2 depicts an exemplary class hierarchy that may be utilized by the embodiments described herein. The exemplary class hierarchy may begin with a parent heterogeneous array class A (200). In an embodiment, the exemplary parent array class A is an abstract base class from which no class instances are instantiated but from which other classes are derived. Objects to be combined together in a heterogeneous array must all be derived directly or indirectly from the same base subclass of the parent heterogeneous array class. In one embodiment, attempting to combine objects from different subclasses of the parent heterogeneous array class results in an error message being generated. Similarly attempting to combine objects instantiated from a class or subclass not derived from the parent heterogeneous array class with objects derived from a subclass of the array class is also not permitted and will generate an error.

The abstract array class A may support subscripted reference and assignment and define concatenation methods. For example, an exemplary class definition for the parent heterogeneous array class may recite:

classdef HeterogeneousHandle<handle
  methods (Sealed)
    obj=horzcat (varargin);
    obj=vertcat (varargin);
    obj=cat (varargin);
    obj=subsasgn (obj, S, V);
  end
  methods (Static, Abstract)
    obj=getDefaultObject;
  end
  methods (Static, Access=protected)
    obj=convert (lhsClassname, rhsValue)
  end
end It will be appreciated that the above class definition is by way of example and is but one of many possible definitions for the parent array class discussed herein.

The class defines horzcat, vertcat, cat, and subsasgn such that objects may always be concatenated together as long as they are all derived from the same immediate base subclass of HeterogeneousHandle. These methods produce either a homogenous or heterogeneous array, depending on the class of the right-hand side objects. If all right-hand side objects are of the same specific class, a homogeneous array is returned. In other words, the class of the right-hand side is retained if the inputs are homogeneous. If the right-hand side objects are of different specific classes, the concatenation and subscripted assignment operations will return a heterogeneous array as long as all right-hand side objects are derived from a common HeterogeneousHandle subclass. A heterogeneous array may be automatically created and returned when operations on objects derived from HeterogeneousHandle result in an array the contents of which differ in their specific class.

The class hierarchy may also include a common base subclass B (210) which is derived from the parent class A (200). The common base subclass B may be abstract or concrete as needed. The common base subclass forms the root of the inheritance tree from which all elements of a given heterogeneous array must be derived. It can be thought of as a trait that all classes must have in order for elements of those classes are to be combined together into an array. Subclasses C (220) and D (222) may be derived from common base subclass B (210). Similarly, subclasses E (230), F (232) and G (234) may be derived from subclass C (220). All of the subclasses are derived, directly or indirectly from the common base subclass B (210) and the parent class A (200). Each subclass derived from another subclass inherits that subclass' properties and methods and may add additional properties and methods of its own. Thus, for example, subclass D (222) includes all of the properties and methods of subclass B (210). Similarly subclass F (232) inherits all of the properties and methods of subclass C (220) which inherited the properties and methods of subclass B (210). Subclass instances instantiated from the subclasses in the hierarchy may be used to populate a specially marked array to form the heterogeneous arrays discussed herein.

Exemplary Array

Figure 3A:
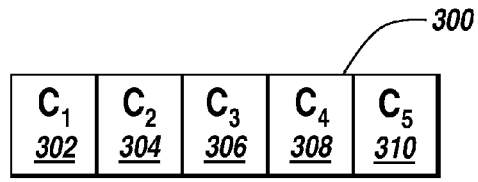
FIG. 3A depicts an exemplary homogeneous array.

FIG. 3A depicts an exemplary array that is populated with subclass instances from the same subclass. Exemplary array 300 includes elements C1 (302), C2 (304), C3 (306), C4 (308) and C5 (310) which are all subclass instances instantiated from subclass C (220) in the exemplary class hierarchy depicted in FIG. 2. As a result, the array may initially be considered a homogeneous array. However, because all of the array elements have been instantiated from a subclass C (220) derived directly or indirectly from the parent array class A (200) and common base subclass B (210), the array 300 may subsequently be altered to become a heterogeneous array.

Exemplary Heterogeneous Array Created with Concatenation

Figure 3B:
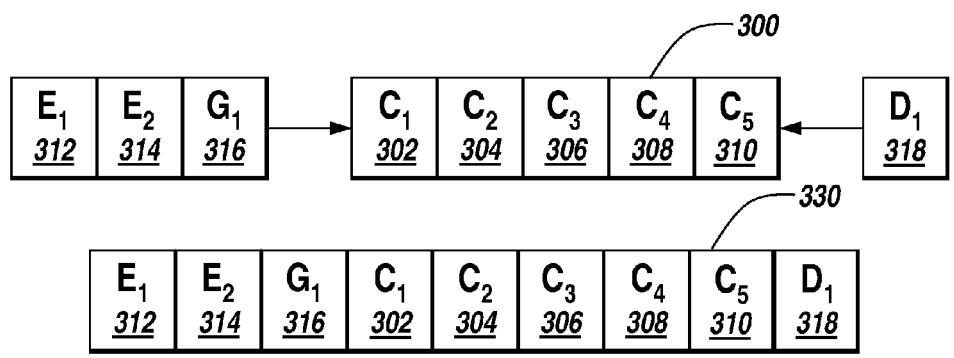
FIG. 3B depicts an exemplary heterogeneous array created from the homogeneous array of FIG. 3A by an embodiment.

FIG. 3B depicts an exemplary heterogeneous array created from the homogeneous array of FIG. 3A by an embodiment of the present invention. Subclass instances E1 (312), E2 (314) and G1 (316) may be concatenated to the front of the array as additional elements. Subclass instances E1 (312), E2 (314) are instantiated from subclass E (230) which is derived from subclass C (220) while subclass instance G1 (316) is instantiated from subclass G (234) which is also derived from subclass C. Similarly subclass instance D1 (318) is instantiated from subclass D (222) which is derived from common base subclass B (210). The result of the concatenation operations is a heterogeneous array 330. Following the two concatenation operations, the greatest common base class common to all instances populating heterogeneous array 330 is determined. For heterogeneous array 330, the greatest common base class is common base subclass B (210) from which subclass D (222) and subclass C (220) directly derive and from which subclass E (230) and subclass G (234) indirectly derive. Mechanisms for determining a greatest common base class are discussed below. Following the determination of the greatest common base class (subclass B (210)), in one embodiment, heterogeneous array 330 may be used as a parameter/input argument for a called method the programming environment 100 identifies as supported by subclass B. The method may operate on heterogeneous array 330 as if heterogeneous array 330 were a homogeneous array of subclass instances instantiated from subclass B.

For example, in a MATLAB® programming environment provided by The MathWorks, Inc. of Natick, Mass., Handle Graphics figure windows may be made up of many different types of interacting graphical objects arranged in a hierarchy. Each graphical object in the figure window is identified by a handle (a unique identifier). In many cases there is a need to create and work with a set of graphical objects that represent some portion of a figure. These graphical objects may or may not be of the same specific type of object. Collections of handles representing the graphical objects in a figure window may be collected in a heterogeneous array as described herein. For a handle graphic figure window, the heterogeneous array may be defined as an array the subclass of which is a common base handle class and which contains objects belonging to different specific classes derived from the common base class. The greatest common base class for the handles in the heterogeneous array may then be determined so as to identify a common subset of methods available to operate on the array as an array of greatest common base class objects. The heterogeneous array of handles may then be passed to one of the identified methods in response to a method call.

In another embodiment in a MATLAB® programming environment, a user preparing graphical images for monthly financial reports may make use of the heterogeneous arrays described herein to control the appearance of the figures. A vector of children handles may be retrieved from Axes objects (a type of an object) and placed in a heterogeneous array. After the determination of the greatest common base class, the heterogeneous array may be used as an input parameter for supported methods in the greatest common base class to create layering effects in the figures and ensure that different objects display properly in different browsers.

In an embodiment, heterogeneous array 330 may include header information or be associated with other information that identifies heterogeneous array 330 as heterogeneous. For example, a heterogeneous array may be identifiable as such by the presence of a flag in the array header. This flag is checked by the language parser or another process in the programming environment 100 when performing operations on the array. Because the programming environment 100 is aware of the nature of the heterogeneous array, subscripted reference and assignment to access array elements may be supported in a similar manner to conventional arrays. The array header may also contain the name of the array class. This is the name of the class to which all subclass elements contained within the array belong. Additional information such as array size and shape may also be saved in the header. In an embodiment, a previously determined identification of a greatest common base for a heterogeneous array may also be stored in the header or with information associated with the array.

It should be appreciated that in another embodiment, the heterogeneous array may initially be created as a heterogeneous array rather than by altering an existing homogeneous array.

Exemplary Heterogeneous Array Created by Overwriting Array Elements

In an embodiment, the act of overwriting an element in an array may cause a homogenous array to become a heterogeneous array even though the array size does not change. For example, if the homogeneous array 300 depicted in FIG. 3A is altered by overwriting array element $C_3$ (306) so that it is replaced by array element $E_1$ (312) depicted in FIG. 3B, the result is a heterogeneous array (assuming the array is properly marked as a heterogeneous array). Similarly, it should be appreciated that an existing heterogeneous array may also have an element overwritten that causes a change in the determined greatest common base class.

Exemplary Heterogeneous Array Created by Removing Elements

Figure 3C:
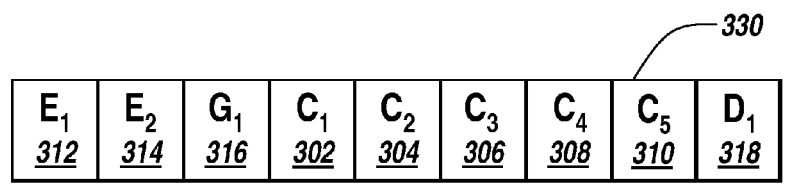
FIG. 3C depicts an exemplary heterogeneous array created by removing elements from the heterogeneous array depicted in FIG. 3B.
Figure 3C:
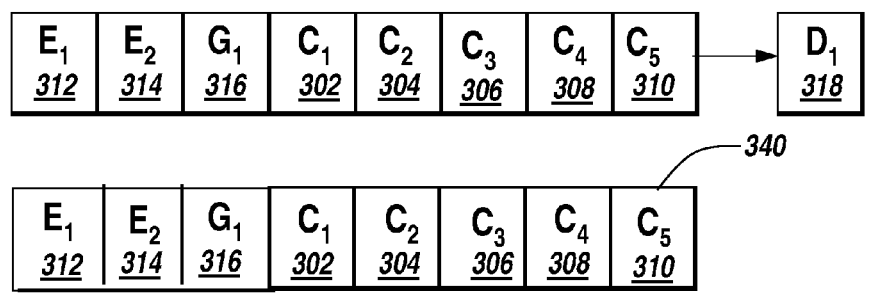

The type of greatest common base class in a heterogeneous array may be affected by the removal of array elements. FIG. 3C depicts an exemplary heterogeneous array 340 created by removing elements from the heterogeneous array 330 depicted in FIG. 3B. Heterogeneous array 330 may be truncated by removing subclass instance D1 to create heterogeneous array 340. Heterogeneous array 340 has a greatest common base class of subclass C (220) since all of the class instances populating the array following the truncation of element D1 (318) are instantiated directly from subclass C (220) or are instantiated from a subclass (E (230) or G (234)) derived from subclass C. Accordingly heterogeneous array 340 can be passed to a method supported by subclass C (220). The method may operate on heterogeneous array 340 as if heterogeneous array 340 were a homogeneous array of subclass instances instantiated from subclass C.

Greatest Common Base Class Determination for Range of Elements in Array

The programming environment 100 may accept a command that allows a range of elements in a heterogeneous array to be passed to a calling method. For example in an embodiment, a greatest common base class is determined separately for a range of elements in a heterogeneous array that is being passed to the method. It should be appreciated that the greatest common base class being determined for the range may differ from the determined greatest common base class for the array as a whole.

Exemplary Mechanisms for Determining Greatest Common Base Class

A number of different mechanisms may be used to determine and record the identity of the greatest common base class. In an embodiment, the hierarchical distance of the subclass (from which a subclass instance is instantiated) from the common base class may be calculated for each array element. The subclass that is derived from a subclass that is the shortest distance to the common base class will be the greatest common base class as long as all of the subclasses from which the instances are instantiated are all derived from a common ancestor. For example with respect to the class hierarchy depicted in FIG. 2, subclass C (220) has a distance of one from common base class B (210) while subclasses E (230), F (232) and G (234) have a distance of two. A heterogeneous array populated exclusively with subclass instances instantiated from subclass C (220), subclass E (230), subclass F (232) and subclass G (234) would have a greatest common base class of C, as subclass C is the shorter of the two distances and all instances are in the same branch of the hierarchy. However, if the array also included a subclass instance instantiated from subclass D (222), the greatest common base class would be considered to be subclass B (210) since subclass D does not have a common ancestor with the other classes other than subclass B.

The greatest common base class may be determined by a language processing module 120 such as a language parser or other similar process for the programming environment 100. The language processing module 120 may maintain or have access to a class hierarchy for valid objects in the programming environment that includes the respective distances of the subclasses from the common base class and a record of which subclasses have common ancestors. Upon detecting an indicator that an array is a heterogeneous array (e.g. by detecting a flag), the language processing module 120 may step through the elements in the heterogeneous array to identify the respective distances to the common base class. In this manner the greatest common base class may be determined for the heterogeneous array. Once identified, the greatest common base class may be stored as part of the header or as part of another record associated with the heterogeneous array. The recorded greatest common base class may be consulted to determine the validity of method calls operating on the heterogeneous array.

When an existing heterogeneous array for which the greatest common base class has already been determined is altered by the addition, overwriting or deletion of elements, the greatest common base class for the array may change or may stay the same. In one embodiment, the language processing module 120 in the programming environment recalculates the greatest common base class by determining whether the subclass instances being added are instantiated from a subclass that has a common ancestor with the other array elements and whether the distance of the new element to the common base class will change the previously calculated greatest common base class. As part of this process, the analysis may determine whether another subclass instance that is instantiated from the same subclass as the instance being added already populates the array. In such a case, no further analysis will be needed as the addition of the new element will not affect the greatest common base class determination.

In another embodiment, upon deleting one or more elements, the other elements remaining in the heterogeneous array may be examined to determine whether the deletion of the element affects the previously determined greatest common base class. Similarly to the process engaged in for added elements, the heterogeneous array may be first evaluated to see if the any of the remaining subclass instances are the same as the instance or instances being removed. As long as at least one of the remaining subclass instances populating the array is instantiated from the same subclass as the instance being removed from the array, the identity of the greatest common base class for the heterogeneous array will not be affected. If none of the remaining subclass instances populating the array is instantiated from the same subclass as the instance being removed from the array, a full determination of the greatest common base class may be conducted to determine whether or not the identity of the greatest common base class has changed.

In an embodiment, when an array element is overwritten and replaced, the elements in the heterogeneous array may be examined to determine whether the overwriting of the element affects the previously determined greatest common base class. Similarly to the process engaged in for added and deleted elements, the heterogeneous array may be first evaluated to see if the any of the unchanging subclass instances in the array are the same as the subclass instance replacing the subclass instance being removed in the overwriting process and whether the array still contains a subclass instance that is the same as the subclass instance being removed. If both conditions are true, the identity of the greatest common base class for the heterogeneous array will not be affected. If either the replacement subclass instance or the removed subclass instance is the sole subclass instance in the array however, a full determination of the greatest common base class may be conducted to determine whether or not the identity of the greatest common base class has changed.

In an alternative embodiment, rather than identifying a greatest common base class as outlined above for each heterogeneous array, the common base class that is derived directly from the parent array class may be designated by default as the greatest common base class (e.g. class B (210) in FIG. 2). While this embodiment simplifies the determination process, it may result in less functionality being available to a user in certain circumstances where a subclass having additional functionality would otherwise have been identified as the greatest common base class. It should be noted that this option is not available when the common base class is abstract.

Method and Property Access

In order for a method to be valid for all elements of a heterogeneous array, the method should be defined by the greatest common base class of the array so that the method definition can handle all elements in the array. A method defined by the greatest common base class may be directly defined by that base class or inherited from a superclass. In an embodiment, the method in the greatest common base class that is being invoked on the heterogeneous array must be a sealed method. Sealed methods cannot be overridden by subclasses. The requirement that the method being invoked in the greatest common base class is sealed ensures that there is a single method definition that when applied to the array is the same method that would be applied to any subarray. If the class of any elements in the array were to define a more specific method than that defined by the greatest common base class, then the greatest common base class method may not be able to correctly operate on the whole array. Similarly, in an embodiment, the common subset of methods being defined by the greatest common base class may be those methods that have no further specialization by any of the distinct subclasses instantiated in the array. A method specialization is a definition of a method in a subclass that overrides or extends a superclass method definition. Generally the subclass and superclass methods have the same name or in some languages, the same name and argument list.

The properties of the subclass instances populating the heterogeneous array may be accessed. In one embodiment, only properties that are legal in the greatest common base class may be accessed when accessing the array. This ensures that the property exists for all elements of the array. In one embodiment, only properties that are legal in the common base class (if the common base class is being used by an implementation instead of the greatest common base class as discussed above) may be accessed when accessing the array.

Individual Array Element Access

In the embodiments discussed above, in order to pass the heterogeneous array as an input parameter to a called method, it was noted that the called method must be supported by the determined greatest common base class. However, in one embodiment, methods from subclasses which are not supported by the greatest common base class may still be used to access individual array elements in a heterogeneous array. In such a case, the method from the subclass which is not supported by the greatest common base class is called on the individual array element rather than on the array as a whole. In this manner a user still has the capability to utilize additional functionality that is present in the subclass but not present in the greatest common base class.

Exemplary Method Calling and Property Invocation

Exemplary array operations include method calling and property invocation. Exemplary method calling operations may:
1. Check if the array upon which the method has been called is heterogeneous
   a. If yes, go to step 2
   b. If no, regular method dispatching rules apply
2. Check if the invoked method is a method of the common base class and is a sealed method
   a. If yes, go to step 3
   b. If no, issue an error—the method invocation is not valid
3. Check that the method is callable in the context of the call, i.e., check permission settings
   a. If yes, go to step 4
   b. If no, issue an error—insufficient permission to call the method
4. Invoke the method with the array as an input Exemplary property invocations may:
1. Check if array is heterogeneous
   a. If yes, go to step 2
   b. If no, regular property access rules apply.
2. Check if the property is a property of the common base class
   a. If yes, go to step 2
   b. If no, issue an error—the property reference is invalid
3. Check if the property can be referenced in the context of the call, i.e., check permission settings
   a. If yes, go to step 3
   b. If no, issue an error—insufficient permission to reference the property
4. Reference the property of the object array Exemplary Processing FIGS. 4-7 depict exemplary processing used by embodiments of the present invention to create and utilize heterogeneous arrays.

Figure 4:
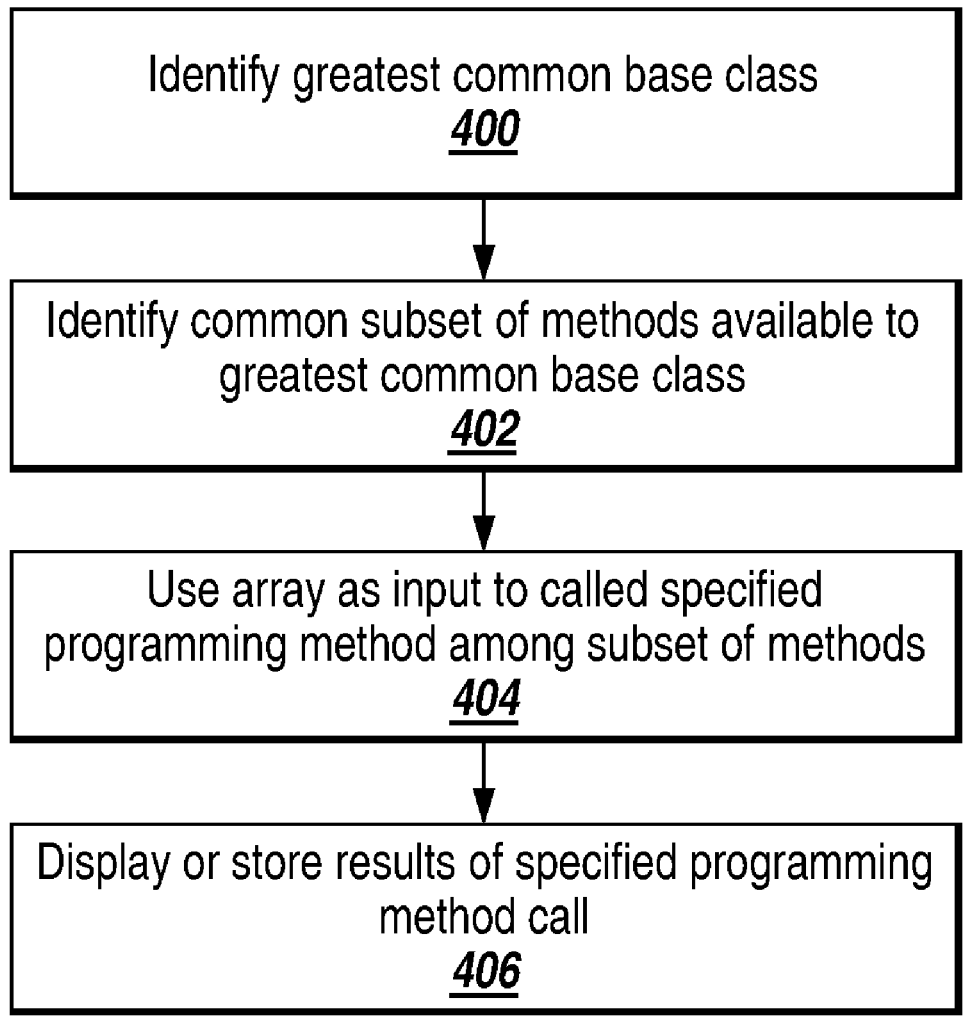
FIG. 4 depicts exemplary processing performed with a heterogeneous array.

FIG. 4 depicts exemplary processing performed with a heterogeneous array. The processing begins with the determination of a greatest common base class for an array that has been designated as a heterogeneous array (step 400). As discussed previously, the heterogeneous array is populated with elements that are instances of unique subclasses derived from the base class and may also include instances of the base class. Once the greatest common base class has been determined, the common subset of methods supported by the greatest common base class is identified (step 402). The subset of methods is a common subset of methods in that it is "common" to all of the elements in the heterogeneous array in that the elements in the array are either instances of the greatest common base class or are instances of a subclass derived from the greatest common base class. The heterogeneous array may then be passed as input in response to a method call of one of the identified common subset of methods (step 404). The called method operates on the array as an array populated exclusively with greatest common base class objects. In other words, the called method treats the array as a homogenous array populated with greatest common base class objects. The operating of the method on the array may result in the alteration of values associated with elements populating the array. The results of the method call may be saved in non-volatile storage or displayed on a display device to a user of the programming environment (step 406).

Figure 5:
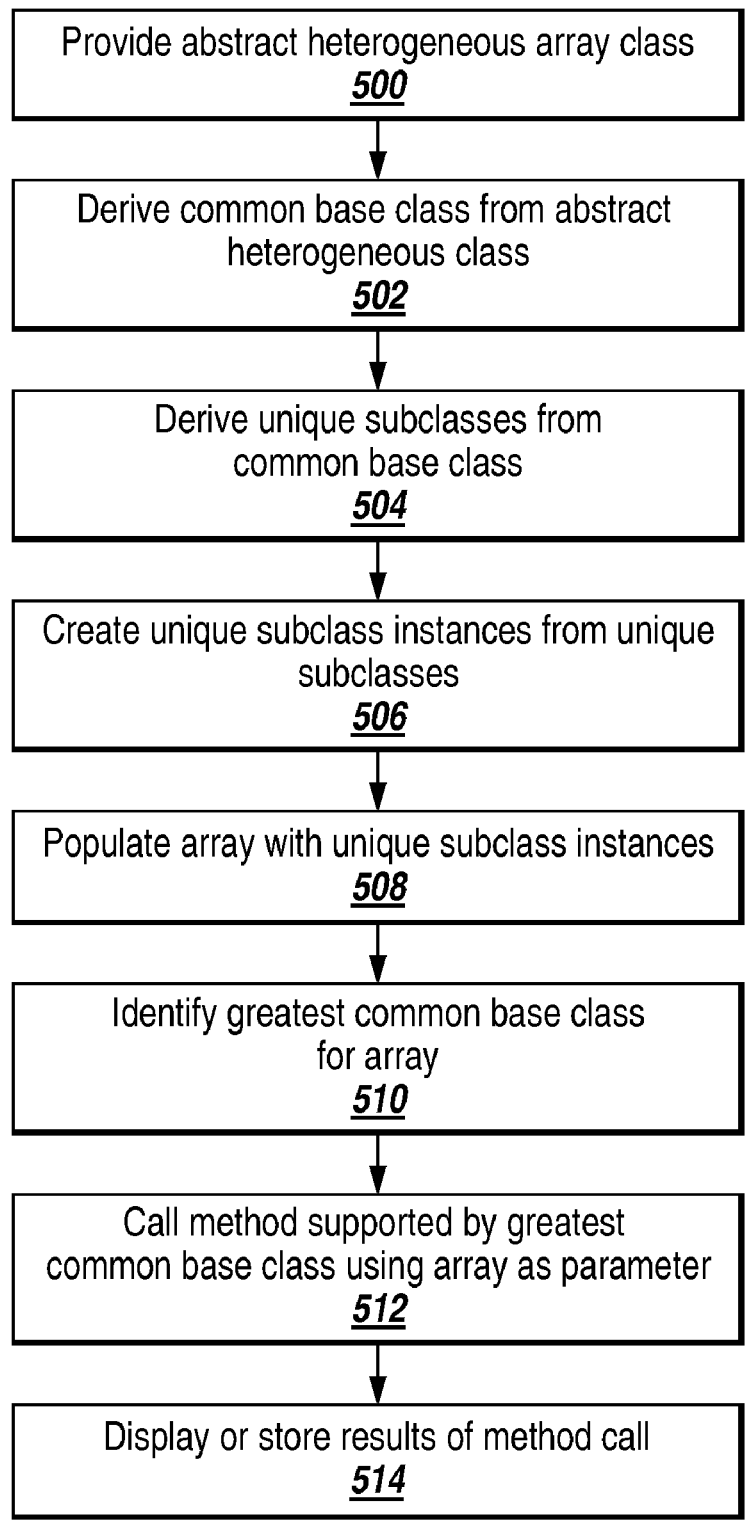
FIG. 5 depicts exemplary processing performed by an alternative embodiment to create a heterogeneous array and identify a greatest common base class for elements in the heterogeneous array.

FIG. 5 depicts exemplary processing performed by an alternative embodiment to create a heterogeneous array and identify a greatest common base class for elements in the heterogeneous array. The processing begins by providing an abstract heterogeneous array class (step 500). The abstract heterogeneous array class may define concatenation methods and support subscripted reference and assignment. A common base class may be derived from the abstract heterogeneous array class (step 502). Unique subclasses may then be derived from the common base class (step 504). The common base class and the derived subclasses may then be used to instantiate unique subclass instances (step 506) that are used to populate a heterogeneous array (step 508). Only subclass instances instantiated from the common base class or from subclasses derived, directly or indirectly, from the common base class may populate the heterogeneous array. The greatest common class for the array is identified (step 510) and the whole array may be passed as input to a method supported by the greatest common base class (step 512). The results of the method call may be stored or displayed (step 514).

Figure 6:
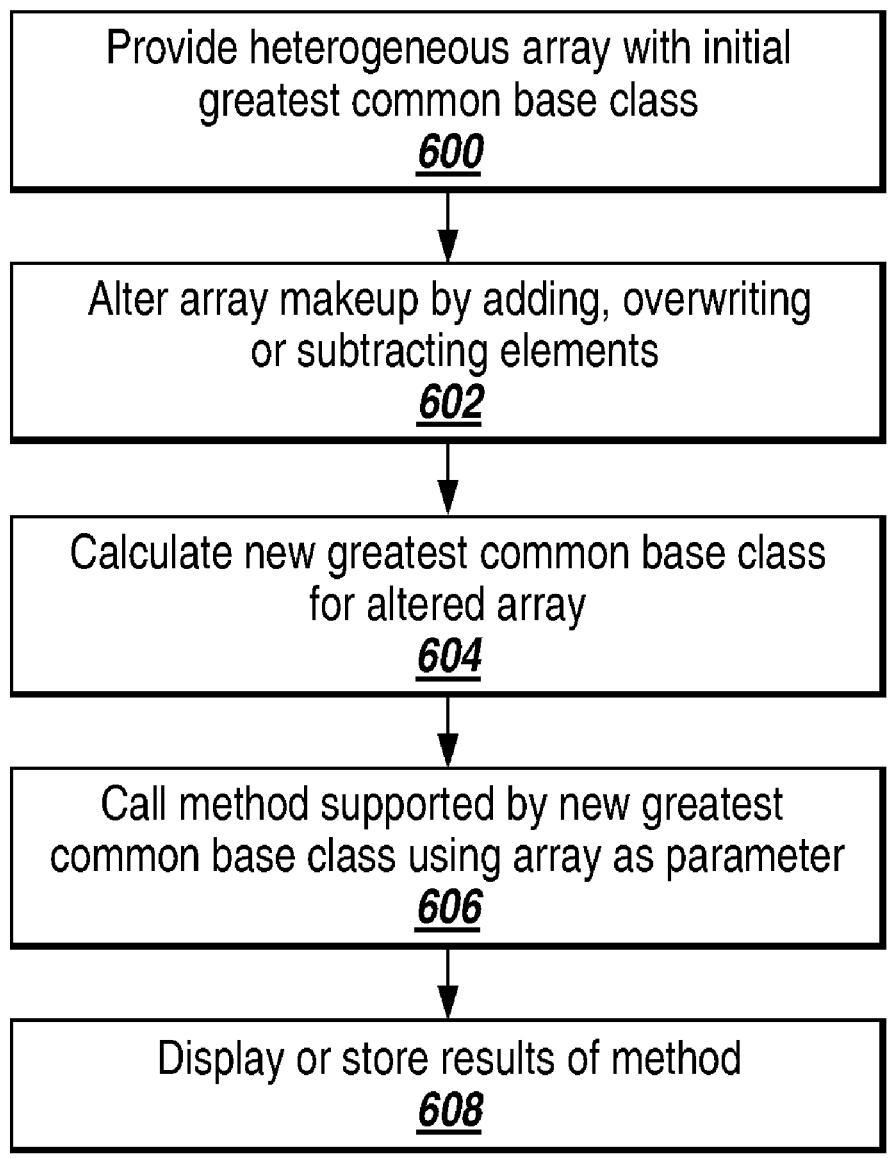
FIG. 6 depicts exemplary processing performed by an embodiment to identify a new greatest common base class for elements in a heterogeneous array that has been altered.

FIG. 6 depicts exemplary processing performed by an embodiment to identify a new greatest common base class for elements in a heterogeneous array that has been altered. The processing begins by providing a heterogeneous array with an initially determined greatest common base class (step 600). The makeup of the array may then be altered by adding, overwriting or removing elements (step 602). Following the alteration, a new greatest common base class for the array is determined (step 604). As previously discussed, in some circumstances the new greatest common base class is the same as the old greatest common base class. The whole array may be passed as input to a method supported by the newly determined greatest common base class (step 606). The results of the method call may be stored or displayed (step 608).

Figure 7:
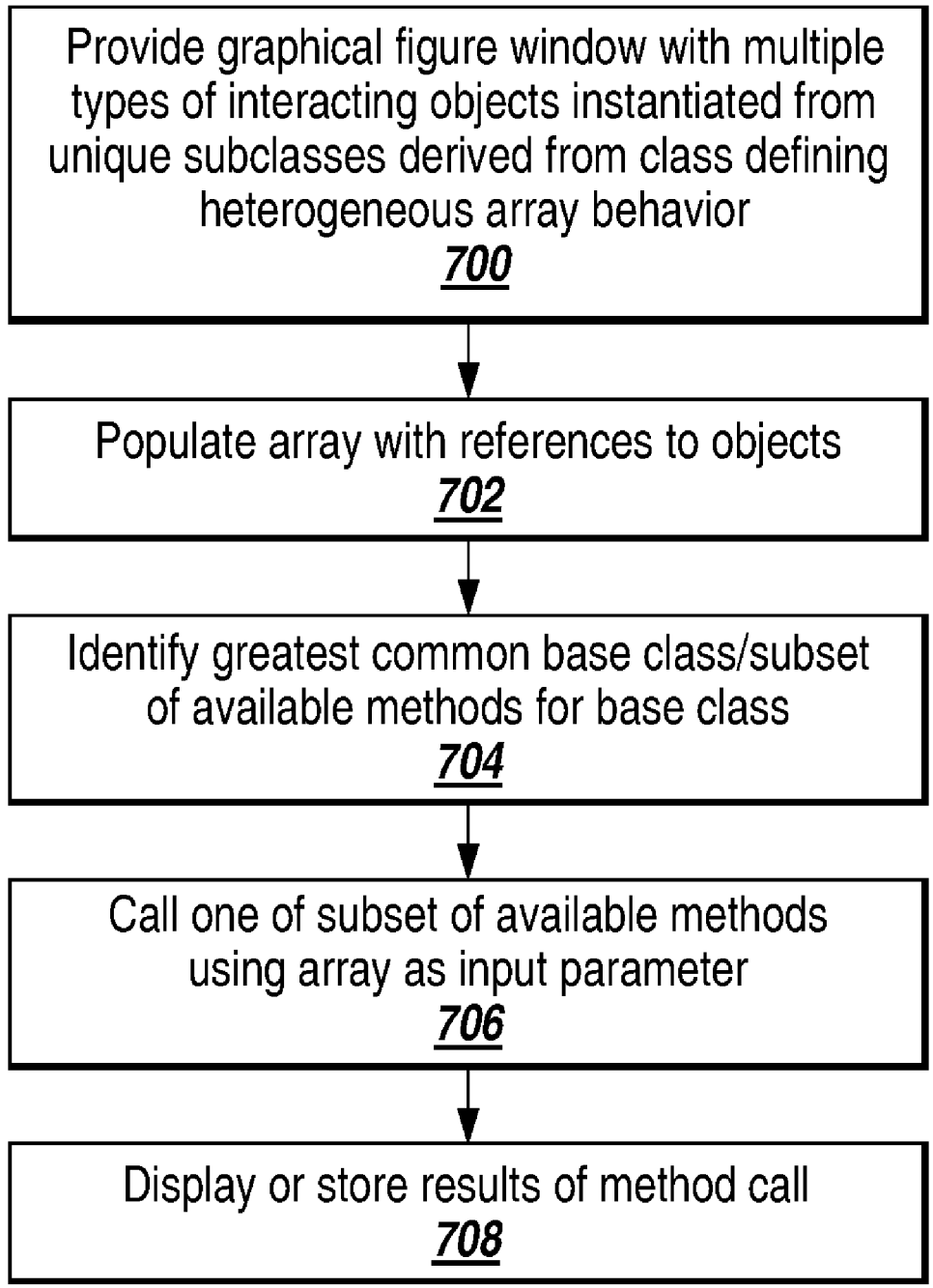
FIG. 7 depicts exemplary processing performed by an embodiment to create and utilize a heterogeneous array associated with a graphical figure window.

FIG. 7 depicts exemplary processing performed by an embodiment to create and utilize a heterogeneous array associated with a graphical figure window. The processing sequence begins by providing a graphical figure window with multiple types of interacting graphical objects instantiated from unique subclasses (step 700). A heterogeneous array is then populated with references to the different types of graphical objects (step 702). A greatest common base class is then determined for the array by considering the different types of class objects referenced by the array elements (step 704). The whole array may be passed as input to a method supported by the newly determined greatest common base class (step 706). For example, the array may be populated with references to different types of graphical ruler objects for monthly financial reports. A designer of the financial reports may dispatch the array as input to a method supported by the determined greatest common base class for the array that operates to change the color of the displayed ruler objects. The results of the method call may be stored or displayed (step 708).

Exemplary Computing Architecture

Figure 8:
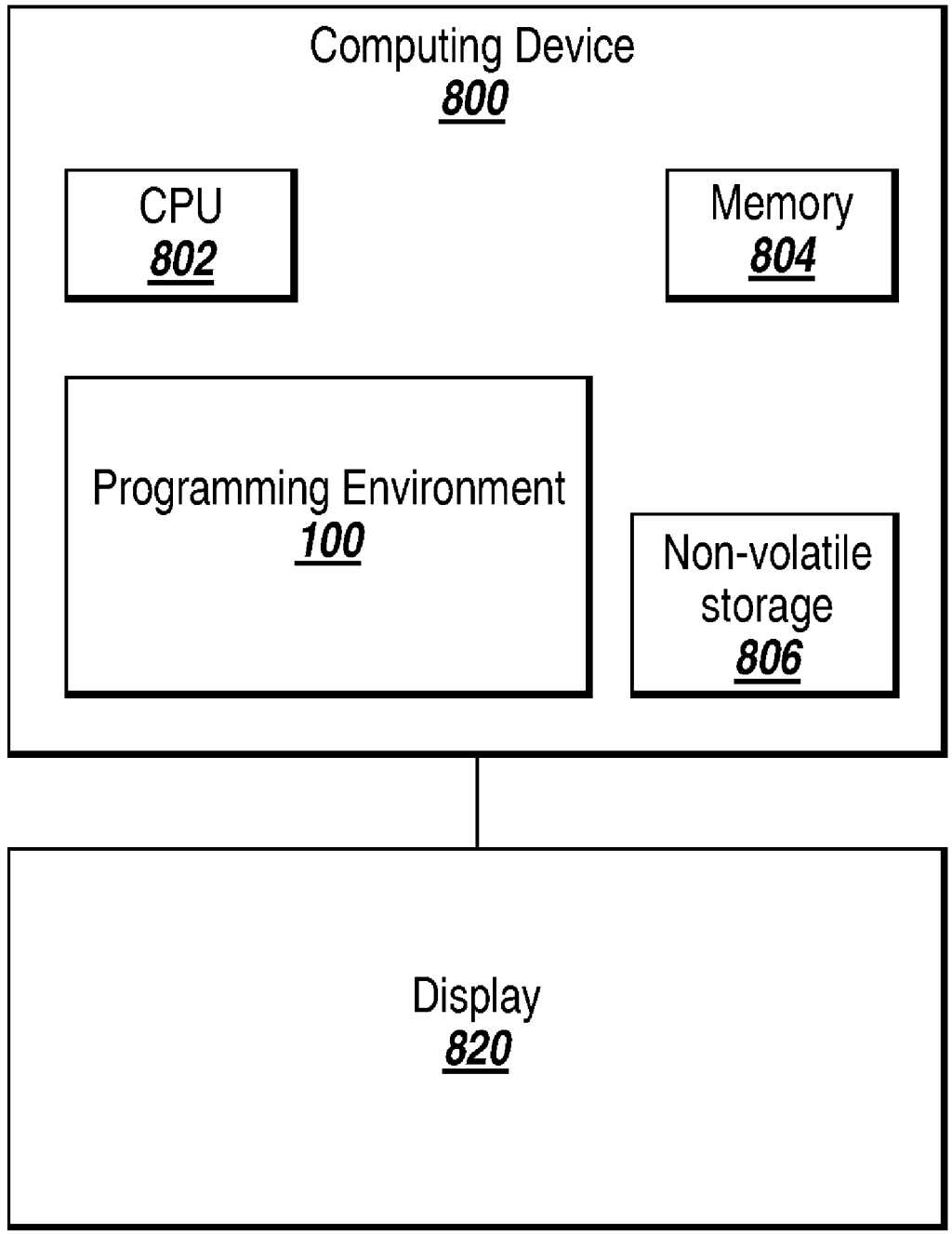
FIG. 8 depicts an exemplary system that may be used to practice an embodiment of the invention.

FIG. 8 depicts an exemplary system that may be used to practice an embodiment of the invention. The exemplary system may include a computing device 800 equipped with a processor 802 for executing computer-executable instructions. Computing device 800 also includes memory 804 and may include non-volatile storage 806. Computing device 800 hosts programming environment 100 (discussed in FIG. 1). Computing device 800 may be in communication with display 820 upon which a graphical user interface (GUI) 830 for the programming environment 100 may be displayed.

Computing device 800 is intended to be illustrative and not limiting of the present invention. Computing device 800 may take many forms, including but not limited to a personal computer, workstation, server, network computer, quantum computer, optical computer, bio computer, Internet appliance, mobile device, a pager, a tablet computer, and the like.

Computing device 800 may be electronic and may include Central Processing Unit (CPU) 802, memory 804, storage 806, input control, modem, network interface, etc. CPU 802 may control each component of computing device 800 to provide programming environment 100. Memory 804 temporarily stores instructions and data and provides them to CPU 802 so that CPU 802 operates the computing device 800.

Optionally, computing device 800 may include multiple CPUs for executing software loaded in memory 804, and other programs for controlling system hardware. Each of the CPUs can be a single or a multiple core processor. The code loaded in memory 804 may run in a virtualized environment, such as in a Virtual Machine (VM). Multiple VMs may be resident on a single processor. Also, part of the code could be run in hardware, for example, by configuring a field programmable gate array (FPGA), using an application specific instruction set processor (ASIP) or creating an application specific integrated circuit (ASIC). Further, part of the applications may be run on analog electronic devices or other resources may be used to run part of the application, such as graphics processing units (GPUs) or dedicated hardware such as Fast Fourier Transform (FFT) processing blocks.

Storage 806 may contain software tools for applications. Storage 806 can include code for the operating system (OS) of the computing device 800, code for at least one application executed by the OS including the applications for the programming environment 100. Storage 806 may also hold data generated from the programming environment 100. Those of ordinary skill in the art will appreciate that parts of applications can be stored in the CPU cache or memory 804 as well, or they can be stored on the network described below with reference to FIG. 9.

Input control may interface with a keyboard, mouse, microphone, camera, such as a web camera, or other input devices such as a 3D mouse, space mouse, multipoint touchpad, accelerometer-based device, gyroscope-based device, etc. Computing device 800 may receive, through the input control, input data, such as the input data for developing a model. Computing device 800 may display on display 820 user interfaces for displaying the data generated from programming environment 100.

Exemplary Network Environment

Figure 9:
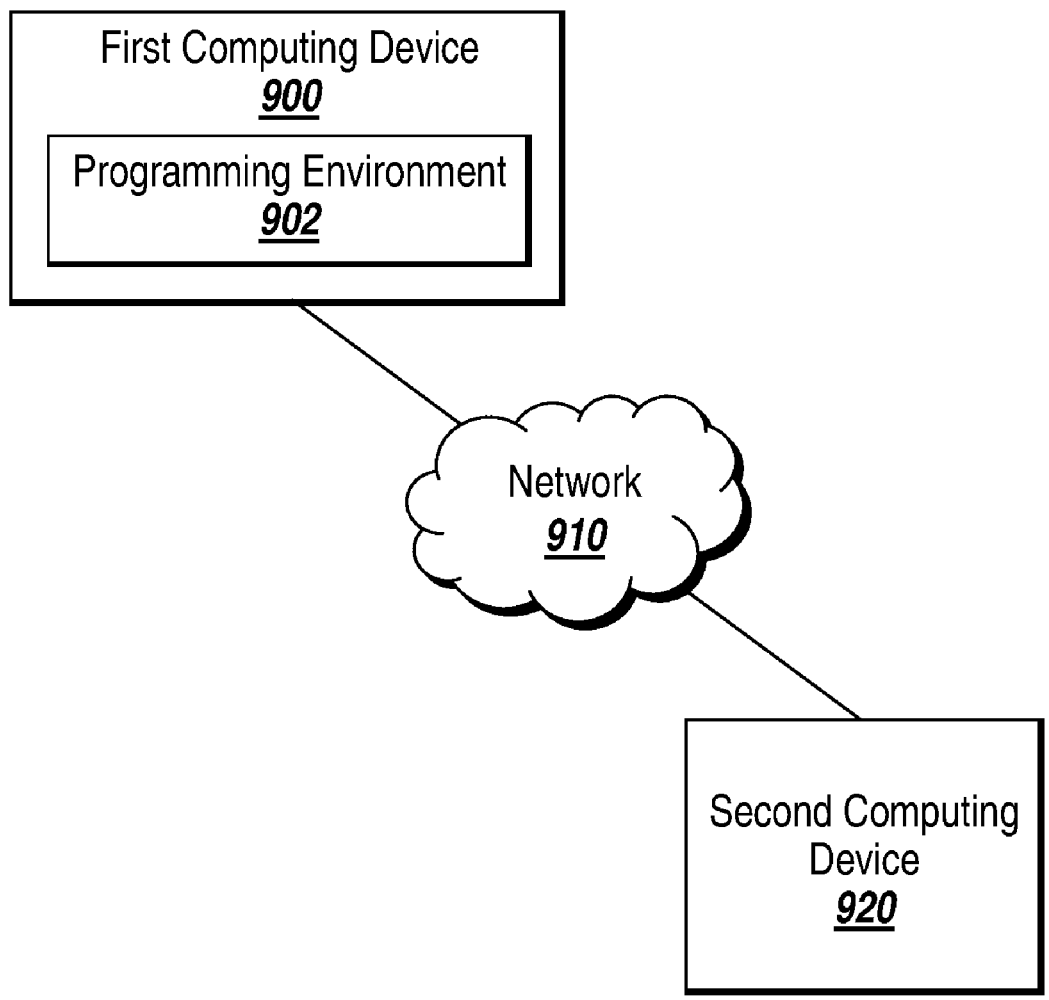
FIG. 9 depicts an exemplary distributed system suitable for practicing a distributed embodiment.

FIG. 9 depicts an exemplary distributed system suitable for practicing a distributed embodiment. In, FIG. 9 an exemplary network environment may include one or more computing devices 900 and 920 communicating via a network 910. Network 910 may be the Internet, intranet, LAN (Local Area Network), WAN (Wide Area Network), MAN (Metropolitan Area Network), wireless network (e.g., using IEEE 802.13 and Bluetooth), etc. In addition network 910 may use middleware, such as CORBA (Common Object Request Broker Architecture) or DCOM (Distributed Component Object Model) to allow a computer on the network to communicate directly with another computer or device that is connected to the network. The communication facilities can support the distributed implementations of the present invention and may utilize Remote Method Invocation (RMI), Remote Procedure Calls (RCP), Simple Object Access Protocol (SOAP), etc.

In the network environment, computing devices 900 and 920 may provide clients with software components or products under a particular condition, such as a license agreement. The software components or products may include those for providing programming environment 902 and/or implementations of code for select elements. In one example, computing device 900 may perform program development in the programming environment 902 using input received from computing device 920.

Additional Alternative Embodiments

The present invention may be provided as one or more computer-readable programs embodied on or in one or more physical mediums. The mediums may be a floppy disk, a hard disk, a compact disc, a digital versatile disc, a flash memory card, a PROM, an MRAM, a RAM, a ROM, or a magnetic tape. In general, the computer-readable programs may be implemented in any programming language. Some examples of languages that can be used include MATLAB programming language, FORTRAN, C, C++, C#, Python, FLASH, JavaScript, or Java. A programming language may be an array-based language. The array-based language is a language where an array is a basic unit of data storage. An array may have zero or more dimensions. An example of an array based language may be a language at least a subset of which is executable in the MATLAB programming environment. The software programs may be stored on, or in, one or more mediums as object code. Hardware acceleration may be used and all or a portion of the code may run on a FPGA, an Application Specific Integrated Processor (ASIP), or an Application Specific Integrated Circuit (ASIC). The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4-7, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-3C and 8-9 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

We claim:

1. A computer-implemented method of accessing heterogeneous objects in an array, comprising:
   providing an abstract heterogeneous array class for an array-based language in a programming environment provided by a computing device;
   deriving a base class from the abstract heterogeneous array class;
   deriving, directly or indirectly, a plurality of unique heterogeneous subclasses from the base class;
   instantiating objects from the plurality of subclasses to create a plurality of subclass instances;
   populating an array in the programming environment with a plurality of instances instantiated from the group of the plurality of subclasses and the base class;
   identifying programmatically with the computing device a greatest common base class for the plurality of subclasses, the greatest common base class hierarchically common to the plurality of subclasses;
   calling a specified method with the array as a parameter, the specified method supported by the greatest common base class, the method call operating on the array in the programming environment as an array consisting of greatest common base class objects, a result of the method call stored or displayed.

2. The method of claim 1 wherein the array is populated entirely with instances instantiated from the plurality of subclasses and the base class is abstract.

3. The method of claim 1, further comprising:
   determining that the method call is a sealed method of the greatest common base class prior to passing the array, the sealed method unable to be overridden by any subclass derived from the greatest common base class.

4. The method of claim 1, further comprising:
   defining concatenation methods in the abstract heterogeneous array class.

5. The method of claim 4, further comprising:
   concatenating to the array at least one additional subclass instance instantiated from a subclass derived, directly or indirectly, from the base class; and
   determining a new greatest common base class in response to the concatenating.

6. The method of claim 1, further comprising:
   identifying a second greatest common base class for the plurality of subclasses populating a range of elements in the array, the second greatest common base class hierarchically common to the plurality of subclasses populating the range of elements in the array;
   passing the range of the array in response to a method call supported by the second greatest common base class, the method call operating on the range of the array as an array consisting of second greatest common base class objects; and
   displaying or storing the result of the method call.

7. The method of claim 1 wherein the array-based language is a dynamically typed language.

8. The method of claim 1, further comprising:
   removing from the array at least one of the plurality of subclass instances; and
   determining a new greatest common base class in response to the removing.

9. The method of claim 1, further comprising:
   calling a non-supported method on an individual array element, the non-supported method supported by a subclass from which the individual array element was derived but not supported by the greatest common base class; and
   passing the individual array element to the non-supported method.

10. The method of claim 1 wherein the abstract heterogeneous array class supports subscripted reference and assignment.

11. A non-transitory physical medium holding computer-executable instructions for accessing heterogeneous objects in an array, the instructions when executing causing a computing device to:
    provide an abstract heterogeneous array class for an array-based language in a programming environment provided by a computing device;
    derive a base class from the abstract heterogeneous array class;
    derive, directly or indirectly, a plurality of subclasses from the base class;
    instantiate objects from the plurality of subclasses to create a plurality of subclass instances;
    populate an array in the programming environment with a plurality of instances instantiated from the group of the plurality of subclass instances and the base class;
    identify programmatically with the computing device a greatest common base class for the plurality of subclasses, the greatest common base class hierarchically common to the plurality of subclasses;
    calling a specified method with the array as a parameter, the specified method supported by the greatest common base class, the method call operating on the array as an array consisting of greatest common base class objects, a result of the method call displayed or stored.

12. The medium of claim 11 wherein the array is populated entirely with instances instantiated from the plurality of subclasses and the base class is abstract.

13. The medium of claim 11, the instructions further causing the computing device to:
    determine that the method call is a sealed method of the greatest common base class prior to passing the array, the sealed method unable to be overridden by any subclass derived from the greatest common base class.

14. The medium of claim 11, the instructions further causing the computing device to:
    define concatenation methods in the abstract heterogeneous array class.

15. The medium of claim 14, the instructions further causing the computing device to:
    concatenate to the array at least one additional subclass instance instantiated from a subclass derived, directly or indirectly, from the base class; and determine a new identification of the greatest common base class in response to the concatenating.

16. The medium of claim 14, the instructions further causing the computing device to:
    identify a second greatest common base class for the plurality of subclasses populating a range of elements in the array, the second greatest common base class hierarchically common to the plurality of subclasses populating the range of elements in the array;
    pass the range of the array in response to a method call supported by the second greatest common base class, the method call operating on the range of the array as an array consisting of second greatest common base class objects; and display or store the result of the method call supported by the second greatest common base class.

17. The medium of claim 16 wherein the array-based language is a dynamically typed language.

18. The medium of claim 11, the instructions further causing the computing device to:

remove from the array at least one of the plurality of subclass instances; and determine a new greatest common base class in response to the removing.

19. The medium of claim 11, the instructions further causing the computing device to:

call a non-supported method on an individual array element, the non-supported method supported by the subclass from which the individual array element was derived but not supported by the greatest common base class; and pass the individual array element to the non-supported method.

20. The medium of claim 11 wherein the abstract heterogeneous array class supports subscripted reference and assignment.

* * * * *